United States Patent
Tsuyuki

(10) Patent No.: US 11,149,669 B2
(45) Date of Patent: Oct. 19, 2021

(54) GASOLINE ENGINE EXHAUST PURIFICATION METHOD AND EXHAUST PURIFICATION DEVICE

(71) Applicant: NISSAN MOTOR CO., LTD., Yokohama (JP)

(72) Inventor: Takeshi Tsuyuki, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/958,217

(22) PCT Filed: Dec. 27, 2017

(86) PCT No.: PCT/JP2017/047084
§ 371 (c)(1),
(2) Date: Jun. 26, 2020

(87) PCT Pub. No.: WO2019/130515
PCT Pub. Date: Jul. 4, 2019

(65) Prior Publication Data
US 2021/0071603 A1    Mar. 11, 2021

(51) Int. Cl.
*F02D 41/00* (2006.01)
*F02M 26/04* (2016.01)
*F02M 26/35* (2016.01)
*F02D 41/14* (2006.01)

(52) U.S. Cl.
CPC ..... *F02D 41/0077* (2013.01); *F02D 41/1445* (2013.01); *F02D 41/1466* (2013.01); *F02M 26/04* (2016.02); *F02M 26/35* (2016.02)

(58) Field of Classification Search
CPC ............ F01N 2560/08; F01N 2900/08; F01N 2900/1406; F01N 2900/1606; F01N 3/021; F01N 3/033; F01N 9/00; F02D 41/0052; F02D 41/0055; F02D 41/0077; F02D 41/025; F02D 41/1445; F02D 41/1466; F02M 26/04; F02M 26/15; F02M 26/35
See application file for complete search history.

(56) References Cited

U.S. PATENT DOCUMENTS

| 9,926,867 B1 * | 3/2018 | Schum | F02M 26/10 |
| 2003/0230060 A1 | 12/2003 | Yahata et al. | |
| 2004/0093866 A1 | 5/2004 | Ishikawa | |
| 2009/0178390 A1 * | 7/2009 | Yahata | F02D 41/0055 60/285 |

(Continued)

FOREIGN PATENT DOCUMENTS

| DE | 10 2009 014 277 A1 | 9/2010 |
| DE | 10 2012 017 278 A1 | 3/2014 |

(Continued)

*Primary Examiner* — Carl C Staubach
(74) *Attorney, Agent, or Firm* — Foley & Lardner LLP

(57) ABSTRACT

Exhaust particulates are collected by a GPF(gasoline particulate filter) device. EGR control is executed, and exhaust gas flowing through an exhaust passage upstream of the GPF device is introduced into an intake passage via an EGR passage. In the EGR control, an opening area of the EGR passage is controlled to reduce the opening area of the EGR passage according to an operating state of the engine as a particulate deposition amount in the GPF device is increased.

5 Claims, 9 Drawing Sheets

(56) References Cited

U.S. PATENT DOCUMENTS

| | | | |
|---|---|---|---|
| 2014/0331643 A1* | 11/2014 | Reich | F02D 41/0055 |
| | | | 60/274 |
| 2018/0258871 A1* | 9/2018 | Hamamoto | F02D 9/02 |
| 2019/0120154 A1* | 4/2019 | Teraya | F02D 41/0077 |
| 2020/0063677 A1* | 2/2020 | Kim | F02D 21/08 |

FOREIGN PATENT DOCUMENTS

| | | |
|---|---|---|
| JP | 2001-152830 A | 6/2001 |
| JP | 2002-138814 A | 5/2002 |
| JP | 2003-065033 A | 3/2003 |
| JP | 2004-162674 A | 6/2004 |
| JP | 2007-211788 A | 8/2007 |
| JP | 2015-222028 A | 12/2015 |
| WO | WO-2017/046947 A1 | 3/2017 |

* cited by examiner

GASOLINE ENGINE EXHAUST PURIFICATION METHOD AND EXHAUST PURIFICATION DEVICE

TECHNICAL FIELD

The present invention relates to an exhaust purification method and an exhaust purification device for a gasoline engine that includes a GPF device and an EGR device.

BACKGROUND ART

Against the background of direct injection etc. of a combustion system, the use of a gasoline particulate filter (hereinafter, called "GPF device") is being studied to further improve exhaust properties. The GPF device is disposed in an exhaust passage to collect particulates in the exhaust gas of a gasoline engine. JP 2015-222028 discloses the following technology related to a gasoline engine that includes a GPF device and an EGR device for introducing a part of exhaust gas flowing through an exhaust passage into an intake passage. In the gasoline engine, a first EGR path configured to take in exhaust gas from an exhaust passage upstream of the GPF device and introduce this gas into the intake passage and a second EGR path configured to take in exhaust gas from an exhaust passage downstream of the GPF device and introduce this gas into the intake passage are provided, and a path actually used is switched between the first EGR path and the second EGR path (paragraphs 0005 to 0010 and 0025).

SUMMARY OF INVENTION

The technology of JP 2015-222028 is to select the second EGR path considering that there are many exhaust particulates that pass through the GPF device without being collected while exhaust particulates collected on a carrier (filter substrate) of the GPF device are small and a particulate deposition amount is small. On the other hand, the technology is to switch to the first EGR path assuming that the passing of exhaust particulates is suppressed and exhaust particulates can be sufficiently collected when the deposition of exhaust particulates progresses and the particulate deposition amount increases.

As described above, the above technology is to provide a path (first EGR path) for taking in exhaust gas from the exhaust passage upstream of the GPF device, but does not consider an impact of a particulate deposition amount in the GPF device on the EGR control. Because a pressure loss generated in the GPF device increases that much as the particulate deposition amount increases, there is a concern that an actual EGR rate changes with respect to the opening degree of an EGR valve. This concern is particularly remarkable in a gasoline engine having a large variation in an exhaust flow rate with respect to a load.

An object of the present invention is to provide an exhaust purification method and an exhaust purification device for a gasoline engine that consider the above problems.

According to one aspect of the present invention, an exhaust purification method for a gasoline engine is provided. According to an exhaust purification method for a gasoline engine of the present invention, exhaust particulates are collected by a GPF device, EGR control is executed, and exhaust gas flowing through an exhaust passage upstream of the GPF device is introduced into an intake passage via an EGR passage. In the EGR control, an opening area of the EGR passage is controlled to reduce the opening area of the EGR passage according to an operating state of the engine as a particulate deposition amount in the GPF device is increased.

According to another aspect of the present invention, an exhaust purification device for a gasoline engine is provided.

BRIEF DESCRIPTION OF DRAWINGS

FIG. 7 is a diagram explaining the trend of change in the soot GPF differential pressure DIFs with respect to a soot deposition amount As.

DESCRIPTION OF EMBODIMENTS

Hereinafter, exemplary embodiments of the present invention will be explained with reference to the accompanying drawings.

Explanation of Overall Configuration

Figure 1:
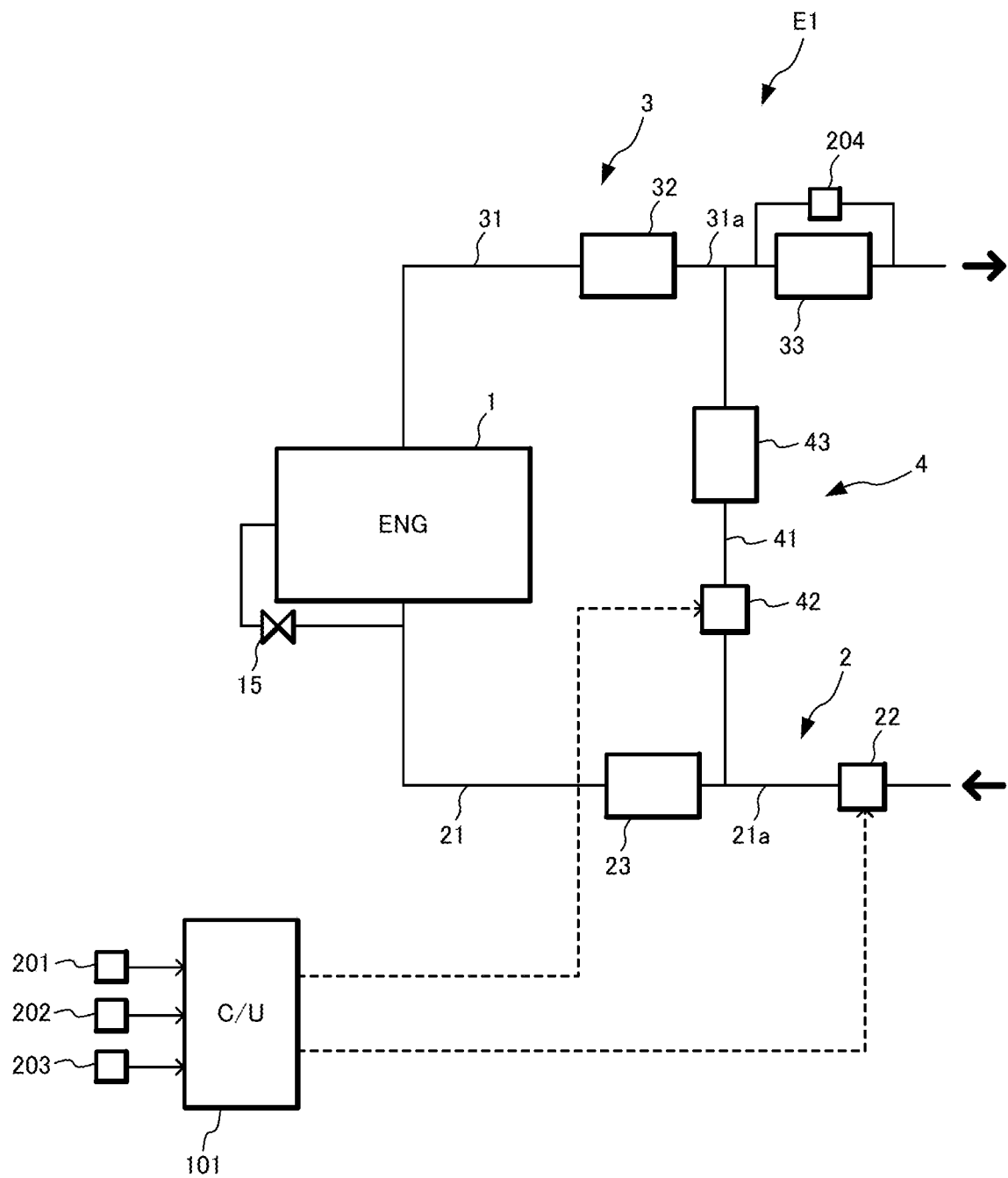
FIG. 1 is a schematic diagram illustrating an overall configuration of a gasoline engine according to one embodiment of the present invention.

FIG. 1 illustrates an overall configuration of a gasoline engine E1 according to a first embodiment of the present invention.

The gasoline engine (hereinafter, simply called "engine") E1 according to the present embodiment includes an engine body 1, an intake device 2, and an exhaust device 3. The engine E1 is a multi-cylinder spark-ignition direct fuel injection engine. The engine body 1 is divided into a crankcase, a cylinder block, and a cylinder head. The engine E1 is provided with a plurality of cylinders. The number of cylinders may be one.

The intake device 2 includes an intake passage 21 and a throttle valve 22 and a collector 23 disposed in the intake passage 21, and supplies air in the atmosphere to the engine body 1 via the intake passage 21. The air taken into the intake passage 21 undergoes flow control by the throttle valve 22 and then flows into the collector 23 and is distributed to the cylinders of the engine body 1 by a manifold provided downstream of the collector 23.

The exhaust device 3 includes an exhaust passage 31 and a catalytic converter 32 and a GPF (gasoline particulate filter) device 33 disposed in the exhaust passage 31, and discharges exhaust gas generated by combustion in the engine body 1 into the atmosphere via the exhaust passage 31. The exhaust gas discharged from the cylinders to the exhaust passage 31 after the combustion in the engine body 1 is collected by a manifold, and further undergoes the required post-processing by the catalytic converter 32 and the GPF device 33 and then is discharged into the atmosphere.

The catalytic converter 32 contains therein a three-way catalyst, but the embodiment is not particularly limited to this.

The GPF device 33 has a filter carrier that can collect particulates (hereinafter, it may be referred to as "exhaust particulates") in the exhaust gas generated in the gasoline engine. A honeycomb-shaped monolithic carrier made of cordierite can be exemplified as such a filter carrier. The filter carrier used for the GPF device 33 has characteristics that its thickness is thinner, a heat-resistant temperature is lower (e.g., approximately 1,350° C.), and a pressure loss is smaller, compared to a filter carrier of a DPF (diesel particulate filter) device made of silicon carbide (SiC) etc. The GPF device 33 is arranged in the exhaust passage 31 so that the exhaust gas passes through the filter carrier, and the exhaust gas is filtered when passing through the filter carrier so as to remove particulates in the exhaust gas. The exhaust particulates include soot generated by the combustion of gasoline fuel as well as ash derived from engine oil. As a differential pressure generated in the GPF device 33, the present embodiment considers a differential pressure due to soot as well as a differential pressure due to ash.

An EGR device 4 that performs the external EGR is provided in the present embodiment. A part of the exhaust gas discharged from the engine body 1 to the exhaust passage 31 is recirculated to the engine body 1 by the EGR device 4. The EGR device 4 roughly includes an EGR passage 41 connecting the exhaust passage 31 and the intake passage 21 and an EGR valve 42 and an EGR cooler 43 disposed in the EGR passage 41. The EGR device 4 adjusts a substantial opening area of the EGR passage 41 by using the EGR valve 42 so as to control a ratio (e.g., mass ratio, hereinafter, called "EGR rate") of exhaust gas (hereinafter, it may be referred to as "EGR gas") recirculated from the exhaust passage 31 with respect to fresh air supplied to the engine body 1. The EGR passage 41 connects the exhaust passage 31 upstream of the GPF device 33 and the intake passage 21 downstream of the throttle valve 22. In the present embodiment, the EGR passage 41 connects an exhaust passage 31a between the catalytic converter 32 and the GPF device 33 and an intake passage 21a between the throttle valve 22 and the collector 23. The EGR cooler 43 is configured as a heat exchanger that performs heat exchange between the EGR gas and engine cooling water. The EGR gas is cooled by the EGR cooler 43 after being taken into the EGR passage 41 and before flowing into the intake passage 21.

Configuration of Control System

All the operations of the engine E1 that includes the EGR device 4 are controlled by an engine controller 101. In the present embodiment, the engine controller 101 is configured as an electronic control unit and includes a central processing unit (CPU), various storage devices such as ROM and RAM, an input-output interface, and the like.

The detection signals from various sensors that detect the operating state or operating condition of the engine E1 are input into the engine controller 101. In the present embodiment, there are provided an accelerator sensor 201 that detects an accelerator pedal operation amount by a driver, a revolution speed sensor 202 that detects a revolution speed of the engine E1, and a cooling-water temperature sensor 203 that detects a temperature of engine cooling water. The detection signals from these sensors 201 to 203 are input into the engine controller 101 as the indices of the engine operating state. The accelerator pedal operation amount is an index of the load required for the engine E1.

The engine controller 101 performs predetermined calculations based on the detected engine operating states, and calculates a target intake air amount and a target fuel injection amount of the engine E1 and calculates a target value (hereinafter, called "target EGR rate") of the EGR rate according to the engine operating state. Based on these calculated values, the engine controller 101 controls the throttle valve 22, a fuel injector (not illustrated), and the EGR valve 42. The fuel injector is disposed in the cylinder head of the engine body 1 so that fuel can be directly injected into the cylinder.

In addition to the above, a differential pressure sensor 204 that detects an actual differential pressure generated in the GPF device 33 is provided in the present embodiment. The detection signal of the differential pressure sensor 204 is also input into the engine controller 101.

Furthermore, in the present embodiment, a PCV (positive crankcase ventilation) valve 15 is disposed in a passage or a conduit connecting the crankcase of the engine body 1 and the intake passage 21. Blow-by gas accumulated in the crankcase can be supplied to the engine body 1 via this passage. The calculation of the target fuel injection amount includes performing correction according to the supplied amount of the blow-by gas.

Explanation by Flowchart

Figure 2:
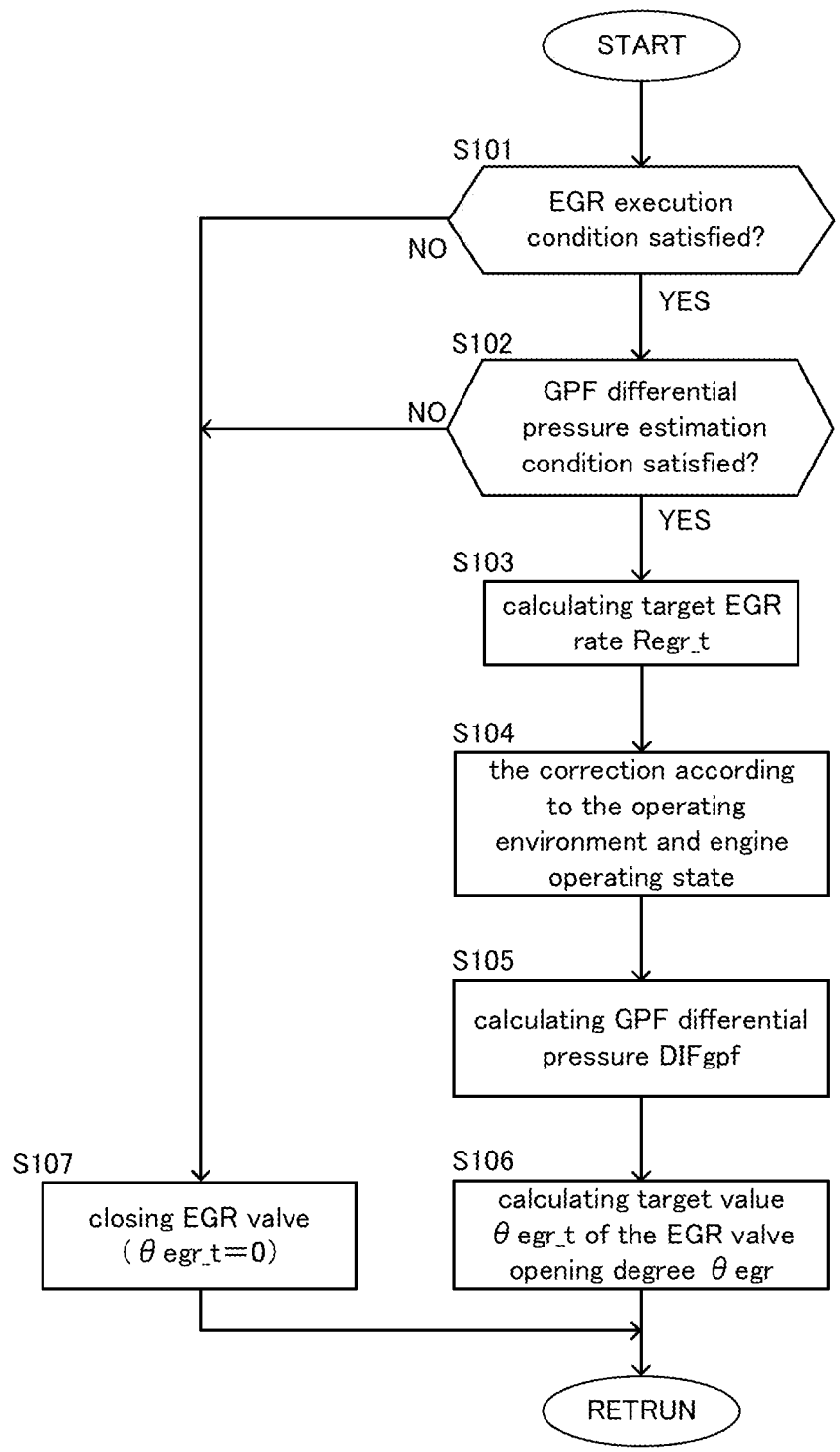
FIG. 2 is a flowchart illustrating a basic flow of EGR control according to the one embodiment.

FIG. 2 is a flowchart illustrating a basic flow of the EGR control (including the correction of the EGR valve opening degree) according to the present embodiment.

The engine controller 101 is programed to execute the EGR control according to the procedure illustrated in FIG. 2 at every predetermined time.

In the EGR control, a target EGR rate Regr_t according to the operating state of the engine E1 is set and an opening degree θegr of the EGR valve 42 is adjusted to achieve the target EGR rate Regr_t, so as to control an EGR rate Regr or a flow rate (hereinafter, called "EGR amount" Vegr) of the EGR gas recirculated into the engine body 1 via the EGR passage 41. In the present embodiment, in the EGR control, a differential pressure generated in the GPF device 33, in other words, a differential pressure (hereinafter, called "GPF differential pressure") DIFgpf before and after the GPF device 33 is detected to perform correction according to the GPF differential pressure DIFgpf.

In S101, an EGR execution condition is checked. When the EGR execution condition is satisfied, the process proceeds to S102. When the condition is not satisfied, it proceeds to S107. The EGR execution condition considers that the EGR device 4 including the EGR valve 42, for example, operates normally and the cooling water temperature is equal to or larger than a predetermined temperature (e.g., 60° C.) in addition to the operating state of the engine E1 being in an EGR range. Only when all the conditions are satisfied, it is determined that the EGR execution condition is satisfied. When the operation of the EGR device 4 is abnormal or when the cooling water temperature is less than the predetermined temperature, this is because there is a concern that water vapor in the EGR gas condenses inside the EGR cooler 43 and thus a large quantity of water is generated. In addition to the above, there is provided a sensor that detects outdoor temperature, and the EGR execution condition may be that the outdoor temperature is equal to or larger than a predetermined temperature (e.g., 0° C.). Even when the outdoor temperature is low, this is because the condensation of water vapor in the EGR gas is concerned. Because soot tends to be generated in large amounts when the temperature of the engine E1 is low and the engine is cold or when fuel is increased such as during being accelerated, the execution of EGR control itself is prohibited assuming that the operating state is not in the EGR range.

In S102, a GPF differential pressure estimation condition is checked. When the GPF differential pressure estimation condition is satisfied, the process proceeds to S103. When the condition is not satisfied, it proceeds to S107. According to the present embodiment, in a GPF differential pressure estimation routine (FIG. 5) to be described later, it is determined that the GPF differential pressure estimation condition is satisfied when the estimation of the GPF differential pressure DIFgpf is not stopped.

In S103, the target EGR rate Regr_t is calculated. The calculation of the target EGR rate Regr_t may be performed by any method already known to those skilled in the art. For example, the target EGR rate Regr_t is calculated by previously preparing a map data to which basic values of the target EGR rate Regr_t according to a revolution speed Ne of the engine E1 and a load Te are assigned and retrieving this map data by using the actual revolution speed Ne and the load Te.

In S104, correction according to the operating environment and engine operating state is performed on the target EGR rate Regr_t. This correction is for reflecting a variable factor, other than those considered in the setting (S103) of the basic values, on the target EGR rate Regr_t. For example, when there is a state where it is not possible to recirculate a sufficient amount of EGR gas in terms of mass if the basic values remain unchanged due to high exhaust gas temperature or when a backflow occurs in the EGR gas under the influence of the pressure pulsation in the exhaust passage 31, the target EGR rate Regr_t is corrected to increase apparently.

Figure 3:
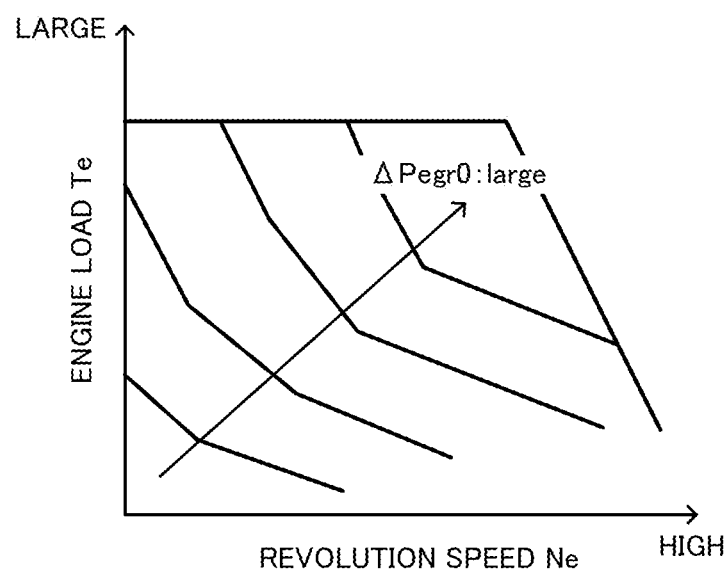
FIG. 3 is a diagram explaining the trend of change in a differential pressure (reference value) $\Delta Pegr0$ before and after an EGR valve according to the engine operating state.
Figure 4:
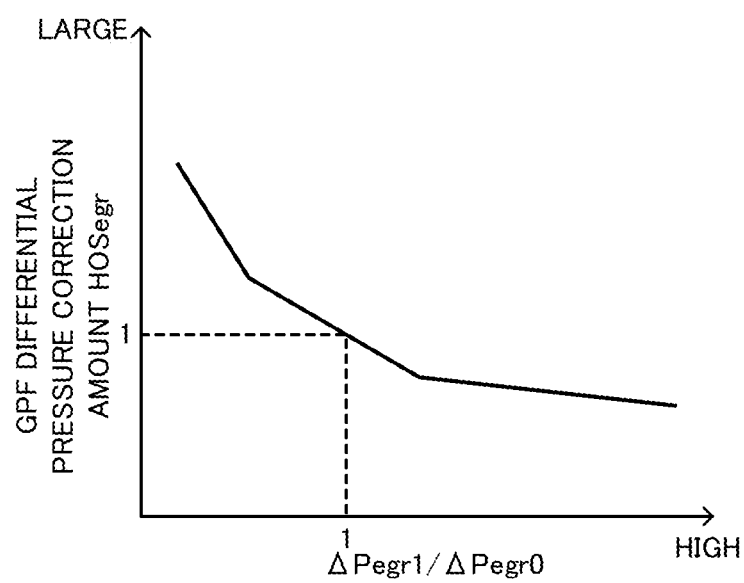
FIG. 4 is a diagram explaining the trend of setting of a GPF differential pressure correction amount HOSegr related to the opening degree of the EGR valve with respect to an actual differential pressure $\Delta Pegr1$.

In S105, the correction amount (hereinafter, called "GPF differential pressure correction amount") HOSegr of the EGR control according to the GPF differential pressure DIFgpf is calculated. In the present embodiment, the GPF differential pressure correction amount HOSegr is calculated as the correction amount of the opening degree (EGR valve opening degree) θegr of the EGR valve 42 according to the GPF differential pressure DIFgpf. As an overall trend, the EGR valve opening degree θegr is decreased with an increase in the GPF differential pressure DIFgpf. For example, the GPF differential pressure correction amount HOSegr is calculated as a smaller value as a ratio (hereinafter, called "differential pressure ratio") ΔPegr1/ΔPegr0 of an actual differential pressure ΔPegr1 generated in the EGR valve 42 with respect to a reference value ΔPegr0 is larger by retrieving a calculation table having a trend illustrated in FIG. 4. Herein, the reference value ΔPegr0 is a differential pressure generated in the EGR valve 42 in a state where a differential pressure is not generated in the GPF device 33, in other words, when the GPF differential pressure DIFgpf is 0, and this value can be estimated from the operating state of the engine E1. More specifically, as illustrated in FIG. 3, the reference value ΔPegr0 is estimated as a larger value as the revolution speed Ne of the engine E1 is higher and the load Te is larger. The actual differential pressure ΔPegr1 can be calculated by adding the GPF differential pressure DIFgpf to a pressure downstream of the GPF device 33, and the pressure downstream of the GPF device 33 can be substituted by atmospheric pressure. The detection of the GPF differential pressure DIFgpf is as described below.

In S106, based on the target EGR rate Regr_t and the GPF differential pressure correction amount HOSegr, a target value θegr_t of the EGR valve opening degree θegr is calculated by the following Equation (1).

$$\theta egr\_t = A(\theta thc) \times Regr\_t \times HOSegr \qquad (1)$$

Herein, $A(\theta thc)$ is an intake opening area according to the opening degree θthc of the throttle valve 22, and Regr_t is the target EGR rate (S104) after correcting the environment and engine operating state.

In S107, the target EGR valve opening degree θegr_t is set to 0 to fully close the EGR valve 42 and to stop the recirculation of the EGR gas. The EGR valve 42 may not only be fully closed, but also may considerably decrease the target EGR rate Regr_t. As a result, even if a differential pressure ΔPegr before and after the EGR valve 42 fluctuates due to the increase in the GPF differential pressure DIFgpf while continuing EGR itself, the influence can be minimized.

As described above, in the present embodiment, a target to be corrected by the GPF differential pressure correction amount HOSegr is the EGR valve opening degree θegr, but the target EGR rate Regr_t may be corrected by the GPF differential pressure correction amount HOSegr. For example, correction according to the environment and engine operating state and correction according to the GPF differential pressure DIFgpf are performed on the target EGR rate Regr_t according to the operating state of the engine E1.

Figure 5:
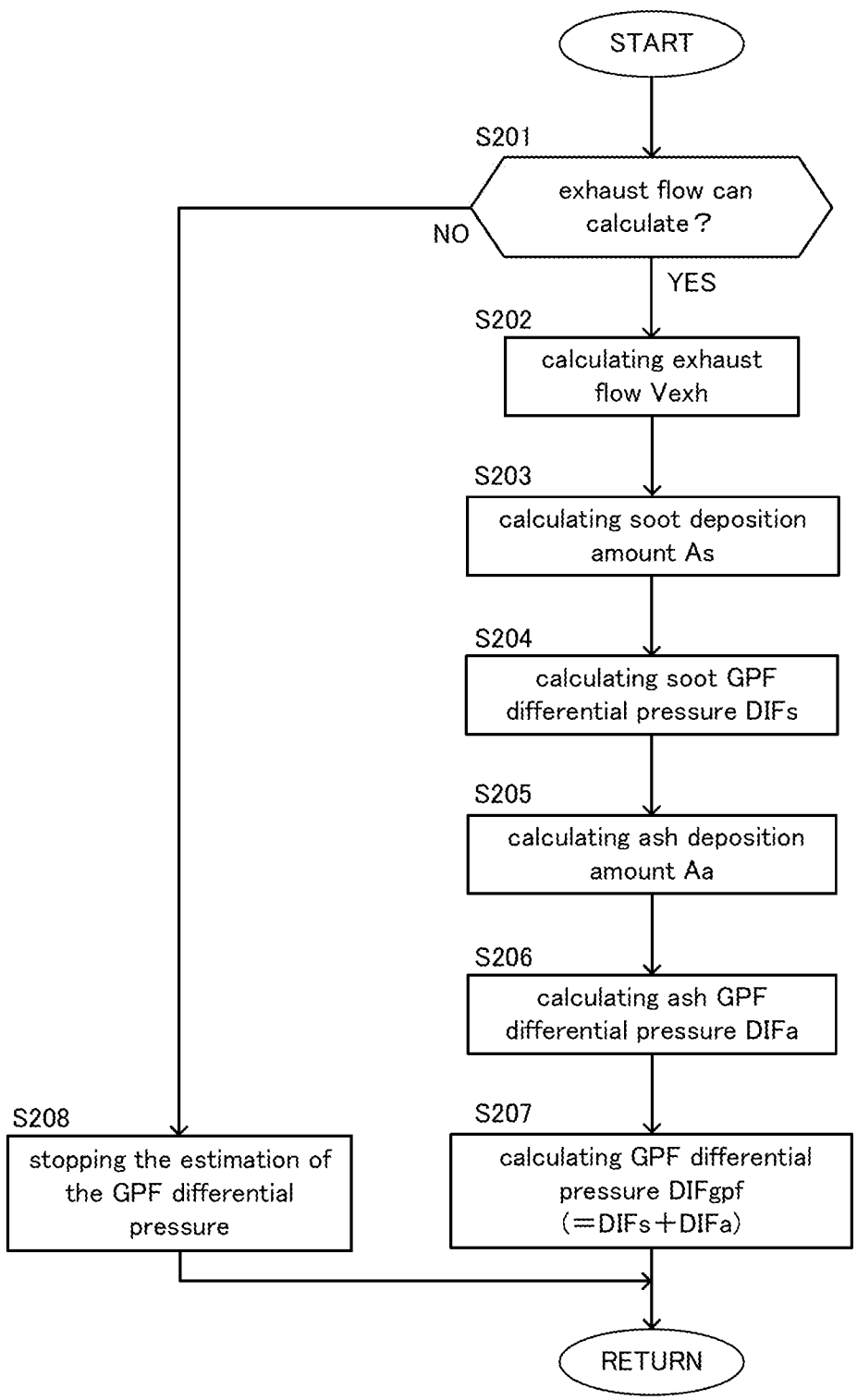
FIG. 5 is a flowchart illustrating the content of processing according to the estimation of a GPF differential pressure DIFgpf.

FIG. 5 is a flowchart illustrating the content of processing according to the detection of the GPF differential pressure DIFgpf.

The engine controller 101 executes the processing illustrated in FIG. 5 at every same or different time as or from the basic routine illustrated in FIG. 2.

In S201, the control system determines whether an exhaust flow rate Vexh of the engine E1 can be detected. In the present embodiment, using the exhaust flow rate Vexh as a volume flow rate, the exhaust flow rate Vexh is detected by an estimation calculation based on various parameters related to this, and the determination of whether the exhaust flow rate Vexh can be detected is performed by determining whether various sensors to detect the above parameters are active and normally operate. When the exhaust flow rate Vexh can be detected, the process proceeds to S202. When the flow rate cannot be detected, it proceeds to S208.

In S202, the exhaust flow rate Vexh is detected. The detection of the exhaust flow rate Vexh may be performed by any method already known to those skilled in the art. For example, the exhaust flow rate can be calculated from an intake air amount Qa, an exhaust gas temperature Texh, and an air-fuel ratio A/F. In addition to the above, the atmospheric pressure may be further considered. The exhaust gas temperature Texh is a temperature in the exhaust passage 31 upstream of the GPF device 33, for example, and is detected by a gas temperature sensor disposed in the exhaust passage 31. Furthermore, the intake air amount Qa is detected by an air flow meter attached to the inlet of the intake passage 21 and the air-fuel ratio A/F is detected by an air-fuel ratio sensor disposed in the exhaust passage 31.

$$Vexh=f(Qa,Texh,A/F) \quad (2)$$

In S203, a soot deposition amount As that is the deposition amount of soot among the exhaust particulates accumulated in the GPF device 33 is calculated. The calculation of the soot deposition amount As is performed by sequentially integrating a discharge amount dAs of soot discharged from the engine body 1 per unit time or unit engine revolution. The unit discharge amount dAs can be calculated from the operating states (e.g., the revolution speed Ne, the load Te, and the cooling water temperature Tw) of the engine E1. Because the soot can be removed by combustion, a reduction amount Areg due to combustion is subtracted from the integrated value of the unit discharge amount dAs. The calculation of the reduction amount Areg can be performed based on the temperature of the GPF device 33 at the time of fuel cut when oxygen in the exhaust gas increases, for example.

$$As=\Sigma(dAs)-Areg \quad (3)$$

Figure 6:
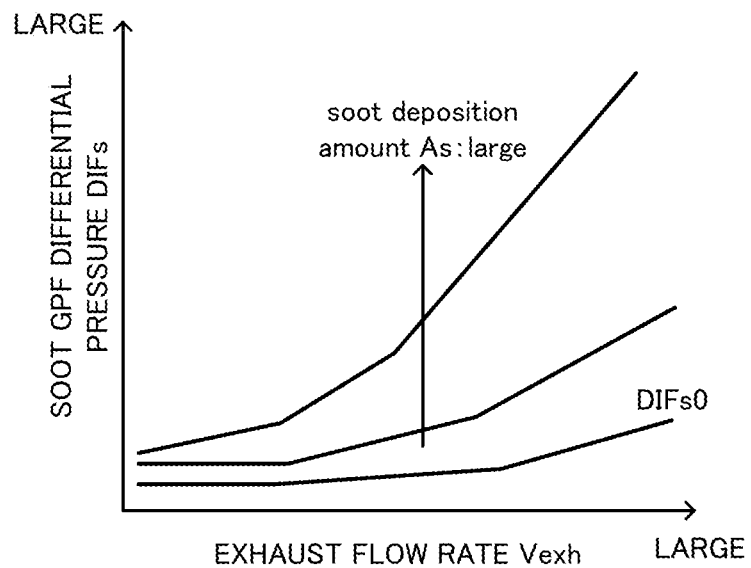
FIG. 6 is a diagram explaining the trend of change in a soot GPF differential pressure DIFs with respect to an exhaust flow rate Vexh.
Figure 7:
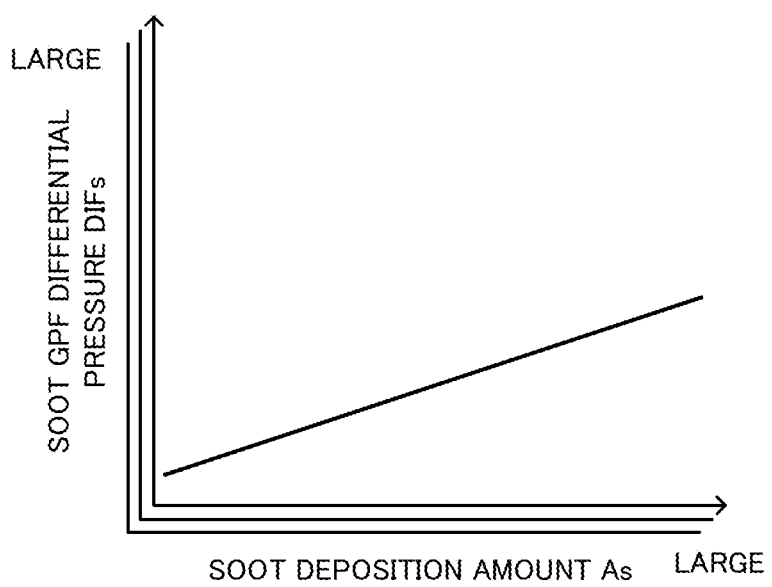

In S204, the GPF differential pressure according to the soot deposition amount As, in other words, a differential pressure (hereinafter, called "soot GPF differential pressure") DIFs due to soot is calculated. FIG. 6 illustrates the trend of change in the soot GPF differential pressure DIFs with respect to the exhaust flow rate Vexh every the soot deposition amount As. The soot GPF differential pressure DIFs0 indicates a differential pressure in a state where the exhaust particulates are not deposited. The soot GPF deposition amount DIFs has a trend to increase as the exhaust flow rate Vexh increases or as the soot deposition amount As increases. The change with respect to the increase in the exhaust flow rate Vexh is steeper as the soot deposition amount As is increased. For the calculation of the soot GPF differential pressure DIFs, a calculation table having a trend illustrated in FIG. 7 is previously prepared every the exhaust flow rate Vexh, for example, and in the case of the actual EGR control, the soot GPF differential pressure DIFs is calculated by retrieving the calculation table according to the exhaust flow rate Vexh by the soot deposition amount As.

In S205, an ash deposition amount Aa that is the deposition amount of ash among the exhaust particulates accumulated in the GPF device 33 is calculated. Similar to the calculation of the soot deposition amount As, the calculation of the ash deposition amount Aa is also performed by sequentially integrating a discharge amount dAa of ash discharged from the engine body 1 per unit time or unit engine revolution.

$$Aa=\Sigma(dAa) \quad (4)$$

Figure 8:
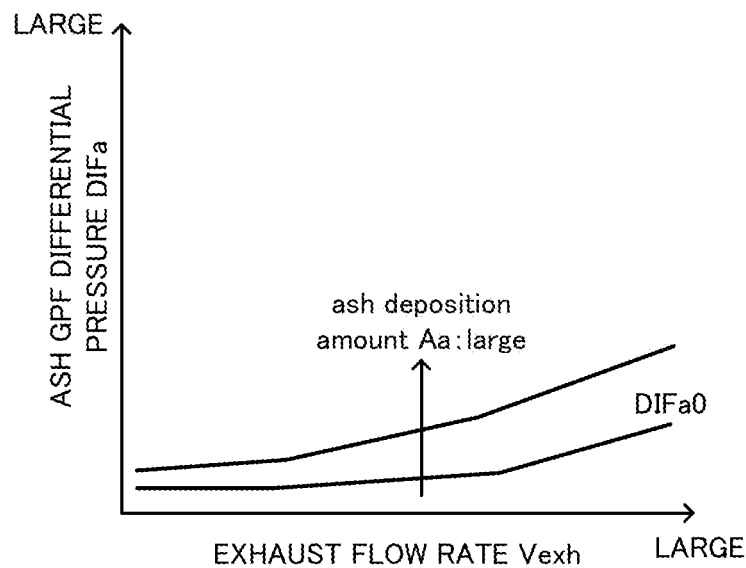
FIG. 8 is a diagram explaining the trend of change in an ash GPF differential pressure DIFa with respect to the exhaust flow rate Vexh.

In S206, a GPF differential pressure according to the ash deposition amount Aa, in other words, a differential pressure (hereinafter, called "ash GPF differential pressure") DIFa due to ash is calculated. FIG. 8 illustrates the trend of change in the ash GPF differential pressure DIFa with respect to the exhaust flow rate Vexh every the ash deposition amount Aa. The ash GPF differential pressure DIFa0 indicates a differential pressure in a state where the exhaust particulates are not deposited. Similar to the soot GPF differential pressure DIFs, the ash GPF differential pressure DIFa also has a trend to increase as the exhaust flow rate Vexh increases or as the ash deposition amount Aa increases, but the change with respect to the increase in the exhaust flow rate Vexh is more gradual compared to the case of the soot GPF differential pressure DIFs. A calculation table obtained by data-processing the relationship between the ash deposition amount Aa and the ash GPF differential pressure DIFa is previously prepared every the exhaust flow rate Vexh, and the ash GPF differential pressure DIFa can be calculated by retrieving the calculation table according to the exhaust flow rate Vexh by the ash deposition amount Aa.

Figure 9:
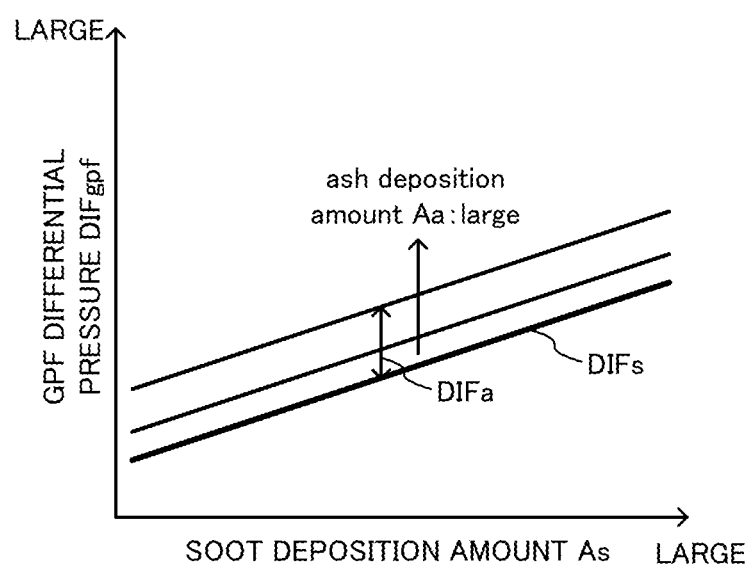
FIG. 9 is a diagram explaining the relationship between the soot GPF differential pressure DIFs, the ash GPF differential pressure DIFa, and the GPF differential pressure DIFgpf.

In S207, the GPF differential pressure DIFgpf is calculated by adding the soot GPF differential pressure DIFs and the ash GPF differential pressure DIFa. FIG. 9 schematically illustrates the relationship of the following Expression (5). Under the specified exhaust flow rate Vexh according to the operating state of the engine E1, the GPF differential pressure DIFgpf is provided as the sum of the soot GPF differential pressure DIFs according to the soot deposition amount As and the ash GPF differential pressure DIFa according to the ash deposition amount Aa.

$$DIFgpf=DIFs+DIFa \quad (5)$$

In S208, the estimation of the GPF differential pressure DIFgpf is stopped.

In addition to the above, the actual GPF differential pressure DIFgpf is detected by the differential pressure sensor 204, and the soot deposition amount As can be calculated from the relationship between the particulate deposition amount and the GPF differential pressure DIFgpf according to the exhaust flow rate Vexh. For example, when the exhaust flow rate Vexh is a sufficient amount to ensure the accuracy of the calculation of the deposition amount, the GPF differential pressure DIFgpf is converted to the particulate deposition amount and the soot deposition amount As is updated by the conversion value. Because the particulate deposition amount obtained from the GPF differential pressure DIFgpf includes the soot deposition amount As as well as the ash deposition amount Aa, the ash deposition amount Aa (=Σ(dAa)) by the sequential integration is set to 0 when the soot deposition amount As is updated.

Furthermore, because it is considered that a change in a particulate deposition amount Agpf of the GPF device 33 that causes a significant change in the GPF differential pressure DIFgpf does not occur when the vehicle is repeatedly started and stopped several times, a measured value by the differential pressure sensor 204 can be used as the GPF differential pressure DIFgpf instead of the estimated value by the sequential integration of the unit discharge amount.

Explanation of Effects

The exhaust purification device for the gasoline engine E1 according to the present embodiment is configured as described above, and the effects obtained by the present embodiment will be described below.

Firstly, the exhaust particulates are collected by the GPF device 33 and thus the discharge into the atmosphere can be suppressed, by interposing the GPF device 33 in the exhaust passage 31 of the engine E1. By reducing the opening area of the EGR passage 41 according to the operating state of the engine E1 with respect to the increase in the particulate deposition amount Agpf in the GPF device 33, an actual EGR rate Regr or an EGR amount Qegr can be suppressed from deviating from a target value according to the engine operating state and the effect of NOx reduction by the EGR control can be ensured, regardless of the expansion (i.e., the increase in exhaust pressure) of a differential pressure before and after the GPF device 33.

Herein, the EGR valve 42 is provided, and the EGR valve opening degree θegr is corrected to a small value with an increase in the particulate deposition amount Agpf to reduce the opening area of the EGR passage 41 and thus relatively easy implementation of the exhaust purification device having the above effect can be performed.

Secondly, by decreasing the opening area of the EGR passage 41 according to the operating state of the engine E1 as the exhaust flow rate Vexh increases, the characteristics of the GPF differential pressure DIFgpf that changes according to the exhaust flow rate Vexh can be reflected on the EGR control (FIGS. 6 and 8). As a result, in the gasoline engine E1 in which the change in the exhaust flow rate Vexh with respect to the load Te is larger compared to an engine such as a diesel engine without intake amount adjustment using a throttle, the opening area of the EGR passage 41 can be more appropriately controlled with respect to the deposition of the exhaust particulates and the actual EGR rate Regr or the EGR amount Qegr can be better followed with respect to the target value.

Because a correction amount (GPF differential pressure correction amount HOSegr) of the EGR valve opening degree θegr with respect to the particulate deposition amount Agpf can be changed in accordance with the exhaust flow rate Vexh, the change in the GPF differential pressure DIFgpf due to the deposition of the exhaust particulates can be precisely reflected by the control or correction of the EGR valve opening degree θegr and thus the optimization of the EGR control can be achieved.

Thirdly, soot generated by the combustion of gasoline fuel as well as ash derived from engine oil are assumed as the exhaust particulates and the particulate deposition amount Agpf in the GPF device 33 is calculated as the sum of the deposition amounts As and Aa of soot and ash, and thus the particulate deposition amount Agpf can be more accurately grasped and the further optimization of the EGR control can be achieved.

Explanation for Another Embodiment

Another embodiment of the present invention will be explained below.

Figure 10:
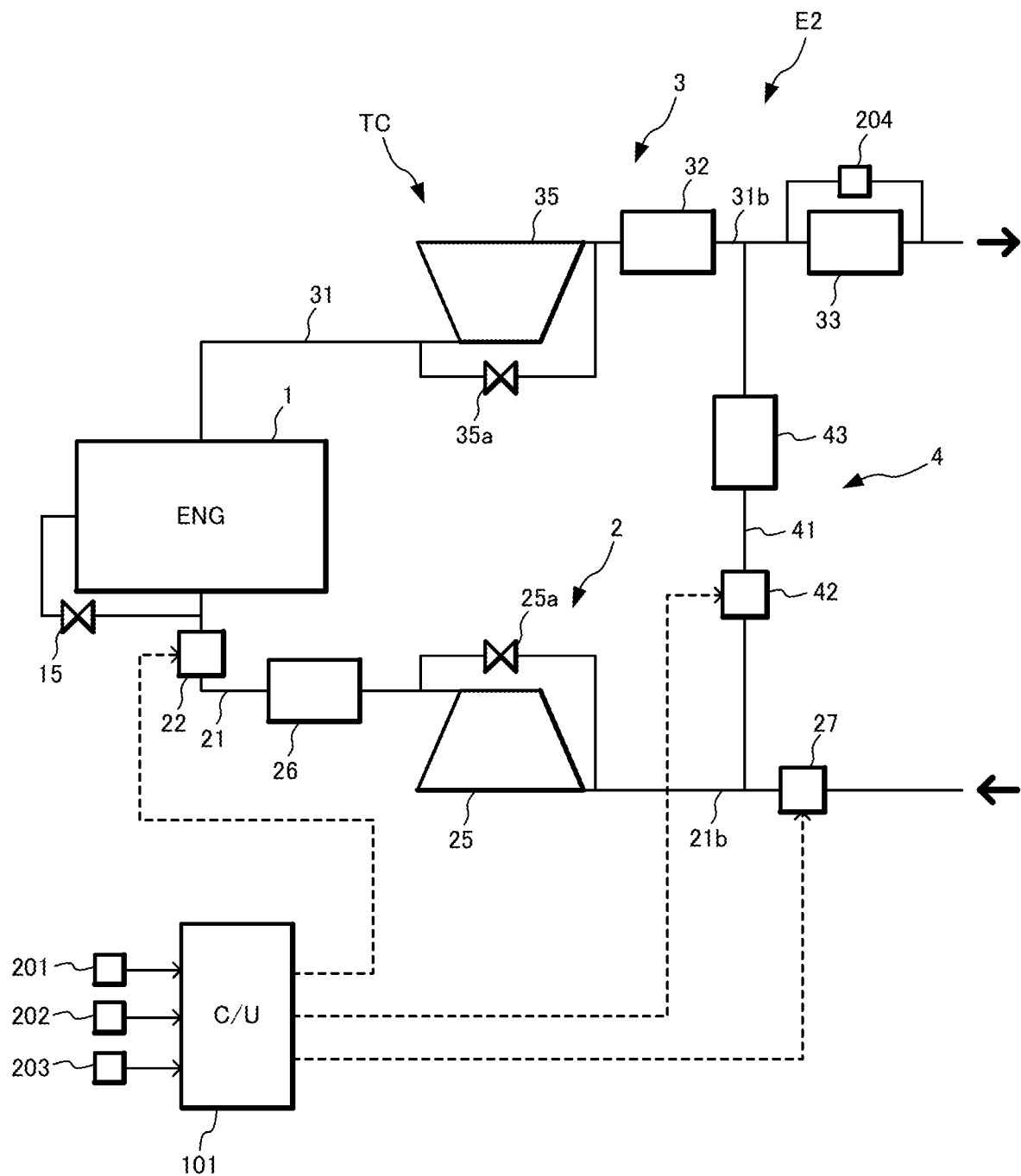
FIG. 10 is a schematic diagram illustrating an overall configuration of a gasoline engine according to another embodiment of the present invention.
Figure 11:
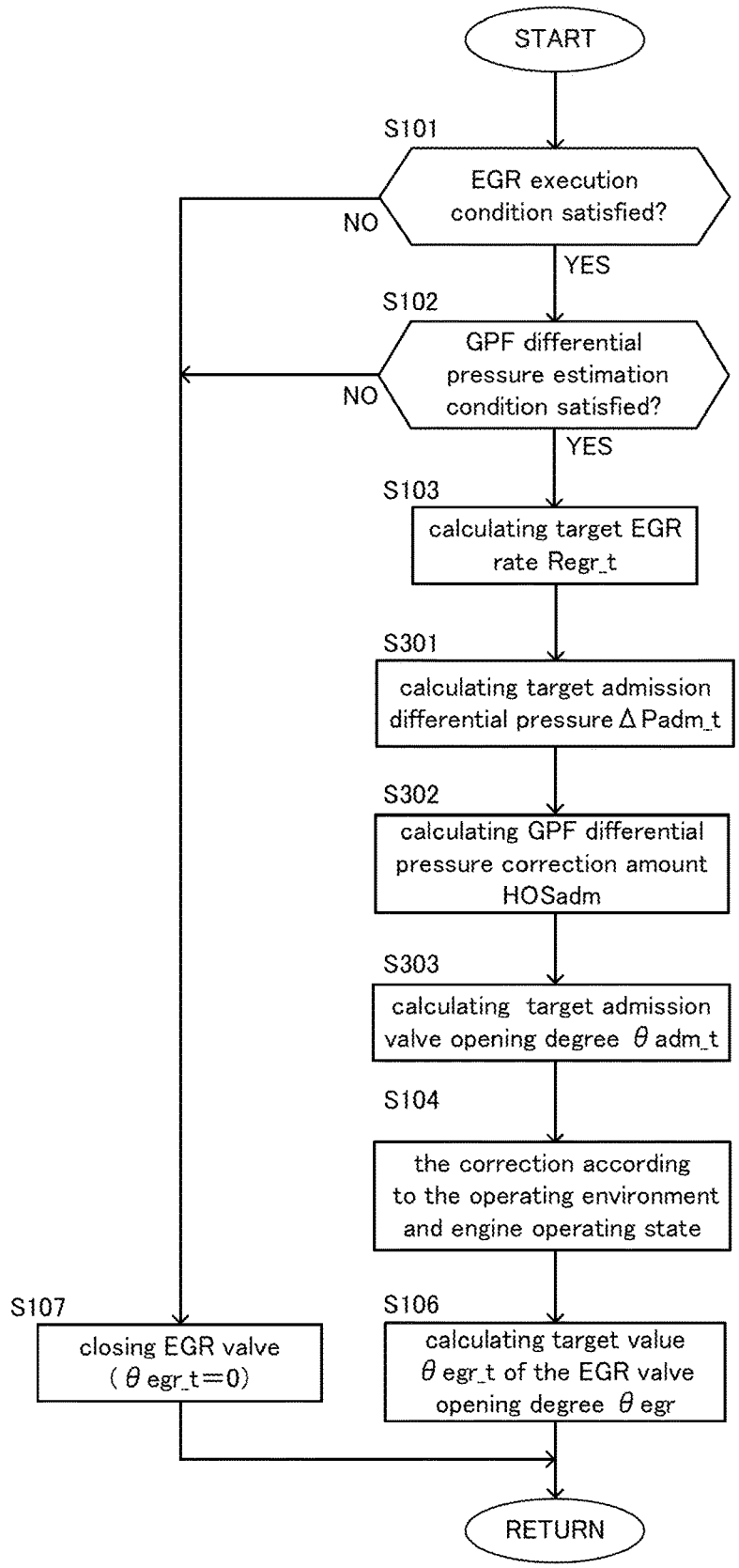
FIG. 11 is a flowchart illustrating a basic flow of EGR control according to the other embodiment.

FIG. 10 illustrates an overall configuration of a gasoline engine E2 according to a second embodiment of the present invention.

The explanation will focus on differences from the engine E1 described above.

The gasoline engine (hereinafter, simply called "engine") E2 according to the present embodiment includes a turbocharger TC. The turbocharger TC includes a compressor 25 disposed in the intake passage 21 and a turbine (corresponding to "exhaust turbine") 35 disposed in the exhaust passage 31. When the exhaust gas passes through the turbine 35, a turbine wheel of the turbine 35 receives exhaust energy to rotate and a compressor wheel coaxially coupled to the turbine wheel is driven to implement supercharging. An intercooler 26 provided in the intake passage 21 downstream of the compressor 25 cools air after compression. A recirculation valve 25a attached to the compressor 25 is for releasing a surplus pressure generated in the intake passage 21 between the compressor 25 and the throttle valve 22 when the throttle valve 22 is closed. A waste gate valve 35a attached to the turbine 35 is for suppressing the excessive rise of supercharging pressure by releasing a pressure generated upstream of the turbine 35.

As in the previous embodiment, the EGR device 4 that performs the external EGR is provided also in the present embodiment, and by the EGR device 4, a part of the exhaust gas flowing through the exhaust passage 31 is introduced into the intake passage 21 and is recirculated into the engine body 1. In this regard, however, in the present embodiment, the EGR passage 41 connecting the exhaust passage 31 and the intake passage 21 connects the exhaust passage 31 downstream of the turbine 35 of the turbocharger TC and the intake passage 21 upstream of the compressor 25. More specifically, any of the catalytic converter 32 and the GPF device 33 is arranged downstream of the turbine 35, and the EGR passage 41 connects an exhaust passage 31b between the catalytic converter 32 and the GPF device 33 and an intake passage 21b between an admission valve 27 and the compressor 25. The admission valve 27 is disposed in the intake passage 21, and is for generating a differential pressure required to execute EGR between an inlet (the exhaust passage 31b) and an outlet (the intake passage 21b) of the EGR passage 41 by increasing a negative pressure on the downstream side by the decrease in the opening degree.

As described above, the low-pressure loop type EGR (LP-EGR) device 4 that takes in the EGR gas from the exhaust passage 31 downstream of the turbine 35 is configured in the present embodiment. However, the EGR device 4 applicable to the present embodiment is not limited to this. Therefore, the EGR device 4 may be a high-pressure loop type (HP-EGR) device that takes in the EGR gas from the exhaust passage 31 upstream of the turbine 35. For high-pressure loop type, for example, the exhaust passage 31 upstream of the turbine 35 and the intake passage 21 downstream of the throttle valve 22 are connected by the EGR passage 41, and the EGR valve 42 and the EGR cooler 43 are disposed in the EGR passage 41. For high-pressure loop type, the admission valve 27 is not required.

FIG. 9 is a flowchart illustrating a basic flow of EGR control (including correction of admission valve opening degree) according to the present embodiment.

As in the previous embodiment, the engine controller 101 performs the EGR control according to the procedure illustrated in FIG. 2 at every predetermined time.

Herein, steps performing the same process as in the previous embodiment have the same reference numbers as in FIG. 2, and their repeating descriptions are omitted.

Figure 12:
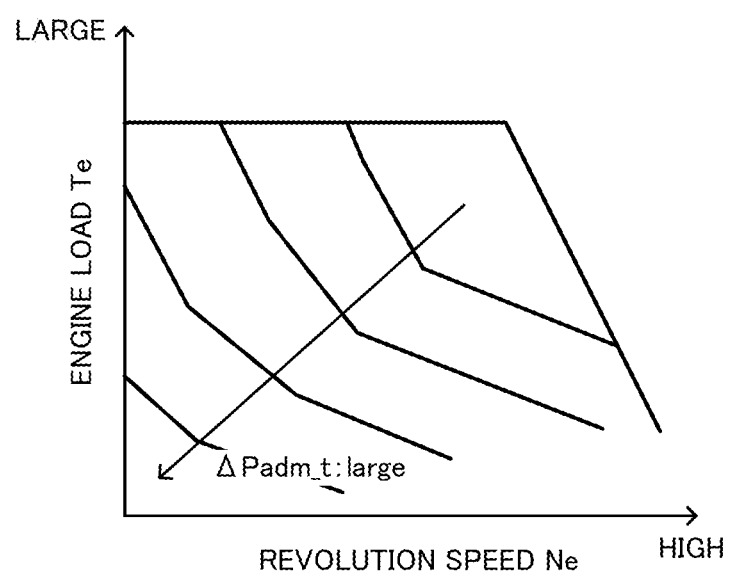
FIG. 12 is a diagram explaining the trend of setting of a target admission differential pressure (basic value) $\Delta Padm\_t$ with respect to the engine operating state.

In S301, a target admission differential pressure ΔPadm_t is calculated. The target admission differential pressure ΔPadm_t is a target value of a differential pressure before and after the admission valve 27, in other words, a negative pressure formed downstream of the admission valve 27, and can be calculated based on the operating state of the engine E2. In the present embodiment, the target admission differential pressure ΔPadm_t is calculated as a larger value as the revolution speed Ne is lower and the load Te is smaller in the EGR area of the engine E2 by retrieving map data having a trend illustrated in FIG. 12.

In S302, a correction amount (GPF differential pressure correction amount) HOSadm of the EGR control according to the GPF differential pressure DIFgpf is calculated. In the present embodiment, the GPF differential pressure correction amount HOSadm is calculated as a correction amount of the target admission differential pressure ΔPadm_t according to the GPF differential pressure DIFgpf, and as an overall trend, the target admission differential pressure ΔPadm_t, in other words, the negative pressure downstream of the admission valve 27 is decreased with an increase in the GPF differential pressure DIFgpf. For example, the GPF differential pressure correction amount HOSadm may be the GPF differential pressure DIFgpf. When the target admission differential pressure ΔPadm_t has a positive value, correction by the GPF differential pressure correction amount HOSadm can be achieved by subtracting the GPF differential pressure DIFgpf as the GPF differential pressure correction amount HOSadm from the target admission differential pressure ΔPadm_t.

$$\Delta Padm\_t = \Delta Padm\_t - HOSadm \quad (6)$$

In S303, a target admission valve opening degree θadm_t is calculated. The calculation of the target admission valve opening degree θadm_t is performed by converting the differential pressure target value ΔPadm_t after being corrected by the GPF differential pressure correction amount HOSadm into the opening degree θadm of the admission valve 27. Because the target admission differential pressure ΔPadm_t is corrected to a smaller value as the particulate deposition amount Agpf in the GPF device 33 tends to be larger and the differential pressure before and after the EGR valve 42 tends to increase, the target admission valve opening degree θadm_t increases with respect to the deposition of the exhaust particulates in the GPF device 33.

$$\theta adm\_t = g(\Delta Padm\_t) \quad (7)$$

In the present embodiment, the calculation (S106) of the target EGR valve opening degree θegr_t is performed based on the target EGR rate Regr_t after correcting the environment and engine operating state.

$$\theta Oegr\_t = A(\theta thc) \times Regr\_t \quad (8)$$

According to the present embodiment, in the EGR control, it is possible to improve the recovery efficiency of exhaust energy by the turbocharger TC and thus achieve both the improvement of exhaust properties and the improvement of fuel efficiency by taking the exhaust gas passing through the turbine 35 of the turbocharger TC into the EGR passage 41.

Herein, by increasing the target admission valve opening degree θadm_t and reducing a negative pressure formed downstream of the admission valve 27 with respect to an increase in the particulate deposition amount Agpf in the GPF device 33, a differential pressure between the inlet and the outlet of the EGR passage 41 can be maintained in a proper range to achieve the target EGR rate Regr_t. Therefore, regardless of the increase in an exhaust pressure due to the deposition of exhaust particulates, the actual EGR rate Regr or the EGR amount Qegr can be suppressed from deviating from a target value according to the engine operating state and the effect of NOx reduction by the EGR control can be ensured.

While the particulate deposition amount Agpf is small, the admission valve 27 is closed and a differential pressure required to execute EGR is formed between the inlet (31b) and the outlet (21b) of the EGR passage 41. On the other hand, when the deposition of the exhaust particulates progresses, a pumping loss can be reduced because there is no need to uselessly increase the intake-side negative pressure to obtain the differential pressure required to execute EGR.

The embodiments of the present invention have been described above, but the above embodiments are only a part of the application example of the present invention and the technical scope of the present invention is not intended to be limited to the specific configurations of the above embodiments. Various changes and modifications can be performed on the above embodiments within the scope of the matters described in the claims.

The invention claimed is:

1. An exhaust purification method for a gasoline engine, the method comprising:
    collecting exhaust particulates by a gasoline particulate filter (GPF) device; and
    executing exhaust gas recirculation (EGR) control of introducing, into an intake passage via an EGR passage, exhaust gas flowing through an exhaust passage upstream of the GPF device, wherein
    an EGR valve is provided in the EGR passage, and
    an admission valve is provided in the intake passage such that a differential pressure generated between an inlet and an outlet of the EGR passage can be increased by a decrease in an opening degree of the admission valve, and
    executing the EGR control comprises
        controlling the opening degree of the admission valve; and
        increasing, in a case where the opening degree of the admission valve is corrected in accordance with a particulate deposition amount, the opening degree of the admission valve according to an operating state of the engine as the particulate deposition amount is increased.

2. The exhaust purification method for the gasoline engine according to claim 1, further comprising:
    arranging a turbocharger in the engine such that an exhaust turbine is located upstream of the GPF device with respect to a flow of the exhaust gas; and
    introducing, into the intake passage via the EGR passage, the exhaust gas flowing through the exhaust passage between the exhaust turbine and the GPF device.

3. The exhaust purification method for the gasoline engine according to claim 1, wherein
    the exhaust particulates include soot in the exhaust gas.

4. The exhaust purification method for the gasoline engine according to claim 1, wherein
    the exhaust particulates include ash in the exhaust gas.

5. An exhaust purification device for a gasoline engine, the device comprising:
    a gasoline particulate filter (GPF) device that is disposed in an exhaust passage of the engine and configured to collect exhaust particulates;
    an exhaust gas recirculation (EGR) device that includes an EGR valve, the EGR device configured to introduce exhaust gas at a flow rate according to an opening degree of the EGR valve into an intake passage from the exhaust passage upstream of the GPF device;
    an admission valve provided in the intake passage such that a differential pressure generated between an inlet and an outlet of an EGR passage can be increased by a decrease in an opening degree of the admission valve; and
    a controller configured to control an operation of the EGR valve,
    wherein in controlling the operation of the EGR valve, the controller is configured to:
    control the opening degree of the admission valve; and
    increase, in a case where the opening degree of the admission valve is corrected in accordance with a particulate deposition amount, the opening degree of the admission valve according to an operating state of the engine as the particulate deposition amount is increased.

* * * * *